(12) United States Patent
Balakiryan et al.

(10) Patent No.: US 9,353,447 B2
(45) Date of Patent: May 31, 2016

(54) MULTIFACTORIAL HYDROGEN REACTOR

(71) Applicant: Solar Hydrogen Holdings, Inc., Van Nuys, CA (US)

(72) Inventors: Konstantin Balakiryan, Phoenix, AZ (US); Hakop Aganyan, Valley Glen, CA (US)

(73) Assignee: Solar Hydrogen Holdings, Inc., Van Nuys, CA (US)

( * ) Notice: Subject to any disclaimer, the term of this patent is extended or adjusted under 35 U.S.C. 154(b) by 0 days.

(21) Appl. No.: 14/883,470

(22) Filed: Oct. 14, 2015

(65) Prior Publication Data

US 2016/0032464 A1    Feb. 4, 2016

Related U.S. Application Data

(63) Continuation of application No. PCT/US2013/050031, filed on Jul. 11, 2013.

(51) Int. Cl.

| C25B 1/04  | (2006.01) |
| C25B 15/02 | (2006.01) |
| C25B 9/06  | (2006.01) |
| C25B 1/02  | (2006.01) |
| C25B 1/06  | (2006.01) |
| C25B 1/08  | (2006.01) |

(52) U.S. Cl.
CPC ... *C25B 1/04* (2013.01); *C25B 1/02* (2013.01); *C25B 1/06* (2013.01); *C25B 1/08* (2013.01); *C25B 9/06* (2013.01); *C25B 15/02* (2013.01)

(58) Field of Classification Search
CPC .............. C25B 1/02; C25B 1/04; C25B 1/06; C25B 1/08
See application file for complete search history.

(56) References Cited

U.S. PATENT DOCUMENTS

| 4,795,537 A    | *  | 1/1989  | Timewell | C25B 1/04 |
|                |    |         |          | 204/229.5 |
| 2010/0101942 A1| *  | 4/2010  | Pless    | C01B 3/042 |
|                |    |         |          | 204/269   |
| 2011/0259757 A1| *  | 10/2011 | Vancina  | C01B 3/042 |
|                |    |         |          | 205/628   |
| 2012/0132535 A1| *  | 5/2012  | Carey    | B01J 7/02 |
|                |    |         |          | 205/340   |

FOREIGN PATENT DOCUMENTS

| RU | 2409704       | 1/2011 |
| RU | 2441106       | 1/2012 |
| WO | WO 2011/014910| 2/2011 |

OTHER PUBLICATIONS

International Search Report for International Patent Application No. PCT/US2013/050031 dated May 7, 2014 in 2 pages.
International Preliminary Report on Patentability for International Application No. PCT/US2013/050031 issued Jan. 12, 2016 in 5 pages.

* cited by examiner

*Primary Examiner* — Nicholas A Smith
(74) *Attorney, Agent, or Firm* — Knobbe, Martens, Olson & Bear LLP (57) ABSTRACT

The present application provides a device for generating hydrogen gas having a plurality of discharge electrode pairs, at least a first oxidation element and a second oxidation element, and at least one electrolysis electrode pair. The at least one electrolysis electrode pair is configured to perform electrolysis by flowing an electric current through the water and using heat generated by the oxidation of the first and second oxidation elements.

19 Claims, 9 Drawing Sheets

MULTIFACTORIAL HYDROGEN REACTOR

CROSS-REFERENCE TO RELATED APPLICATIONS

This application is a continuation of International Application No. PCT/US2013/050031, filed Jul. 11, 2013, designating the United States and published in English on Jan. 15, 2015 as WO 2015/005921 A1, and which is incorporated in its entirety by reference herein.

BACKGROUND

1. Field

The present invention relates to a hydrogen reactor, and, more particularly to a multifactorial hydrogen reactor for use in the internal combustion engines for improving the fuel efficiency and performance thereof and production of the electricity.

2. Description of the Related Art

Hydrogen is the most promising energy source first of all, because it is the most abundant element in the universe. Furthermore, as is known, the combustion of hydrogen produces water again.

The problem of decomposition of water molecules to produce hydrogen for use as a substitute for fossil fuels and for the following transformation to all existing forms of energy: mechanical, electrical, light, electromagnetic, which is the main source of existence of our civilization for more than a few decades, is a focus of the world of science.

In order to break the hydrogen bonds in water and aqueous solutions, researchers are using all kinds of physical and chemical processes. In our opinion, the most accessible and popular ways to produce hydrogen are electrolysis and oxidation of reactive metals.

For all its merits electrolysis has one major drawback—it is a relatively high energy-consuming process. As is known, the mass of one gram equivalent of hydrogen—1 g (½ mole) corresponds to the volume of 11.2 liters (STP). The weight of one gram equivalent of oxygen—8 grams (¼ mole) corresponds to the volume of 5.6 liters (STP). Consequently, the passage of 96485 C charge is allocated 11.2 liters+5.6 L=16.8 liters of Brown's gas, and thus to obtain it, the unit cost of electricity (charge) will be 96485 C: 16.8 liters=5743 C/l.

Many researchers have tried to solve the task of reducing energy costs:

EP0103656A3, Resonant Cavity for Hydrogen Generator, Inventors: Stenley Meyer; Publication date: Aug. 22, 1984.

U.S. Pat. No. 5,089,107 Bi-polar autoelectric hydrogen generator; Inventors: Francisco Pacheco; Publication date: Feb. 18, 1992.

WO2012054842 A2, Enhanced water electrolysis apparatus and methods for hydrogen generation and other applications; Inventors: Michael Lockhart; Publication date: Apr. 26, 2012.

In an effort to increase efficiency in the production of hydrogen, electrolysis cells have been used a variety of approaches, where the relative success was achieved either through design changes, or due to a combination of electrolysis with other methods of exposure to hydrogen bonds.

However, until now, results obtained in the aforementioned patents are not widespread, because they are energy-intensive and failed to become a model for the industrial mass production of hydrogen:

U.S. Pat. No. 8,075,748 B2, Electrolytic cell and method of use thereof; Inventors: Roy E. McAlister; Publication date: Dec. 13, 2011, proposed an electrolytic cell, comprising a tight vessel, electrodes, electric current source in electrical contact with the electrodes, electrolyte, and gas. Wherein this gas is formed during the electrolysis at or near the first electrode, the cell is provided with a separator, which has an inclined surface, and includes an electrode to be able to direct the flow of the electrolyte and the gas by the difference between the density of the electrolyte and the total density of the electrolyte and the gas, so that the gas is moved toward the second electrode.

U.S. Pat. No. 7,922,878 B2, Electrohydrogenic reactor for hydrogen gas production; Inventors: Bruce Logan; Publication date: Apr. 12, 2011.

US 2006/0011491 A1, Bio-electrochemically assisted microbial reactor that generates hydrogen gas and methods of generating hydrogen gas. Inventors: Stephen Grot, Bruce Logan; Publication date: Jan. 19, 2006.

The process of oxidation of reactive metals, particularly relatively cheap aluminum devoted subject of hundreds of studies. Among them, the most interesting patents and scientific papers:

EP 1301433 A1, Hydrogen production from aluminum water and sodium hydroxide. Inventor: Andersen Erling Reidar; Apr. 16, 2003;

Hydrogen Generation by Accelerating Aluminum Corrosion in Water with Alumina, World Academy of Science, Engineering and Technology 55, 2011, Inventors: J. Skrovan, A. Alfantazi, and T. Troczynski.

Activation of aluminum metal to evolve hydrogen from water, Int. J. Hydrogen Energy, 33 (2008) 3073-3076, Inventors: A. V. Parmuzina and O. V. Kravchenko.

None of the methods proposed in the aforementioned patents and scientific papers, including all known chemical dissolution reaction of the oxide film, make a continuous oxidation reaction of hydrogen. Production of hydrogen by aluminum would help revolutionize the energy sector, if the oxidation process was not so brief and not stopped at the appearance of the oxide film on the surface of reagent. For the oxide film to be removed continuously, until the total oxidation of aluminum participating in the reaction, in practice, the oxide film is removed by amalgamation or hot solutions of alkali. However, the chemical process can be interrupted or can use other reagents in the oxidation of aluminum, which are often highly toxic such as mercury chloride.

We conducted a patent search to a depth of 50 years and unfortunately found no methods or devices that would make the process of hydrogen production cost and scale that can be the foundation of future hydrogen energy. However, this search has allowed us to define the priorities in choosing the physical and chemical processes that, while the impact on the water molecules will be able to break the hydrogen bonds splitting "$H_2O$" on the "$H_2$" and "O", necessary to humanity.

Here is a list of physical processes that we are interested in, and links to scientific papers and patents that study these processes:

Electrolysis

Electrolysis of water is the most well-known and well-researched method of hydrogen production. It provides the pure product (99.6-99.9% $H_2$) in one process step. However, the cost of electricity for production of hydrogen is approximately 85.5%; thus making existing methods for producing hydrogen via electrolysis uneconomical.

U.S. Pat. No. 8,308,918 B2, Hydrogen generator; Inventors: Jae Hyoung Gil Jae Hyuk Jang Chang Ryul JUNG.

US 20080245673 A1; Hydrogen generation system; Inventors: Asoke Chandra Das Chaklader, Debabrata Ghosh, Zhaolin Tang, Zhong Xia.

U.S. Pat. No. 8,282,812 B2; Apparatus for producing hydrogen from salt water by electrolysis; Inventor: John Christopher Burtch.

U.S. Pat. No. 7,922,781 B2, Hydrogen generation apparatus and method for using same; Inventors: Anand S. Chellappa, Michael Roy Powell, Charles J. Call.

U.S. Pat. No. 8,075,958 B2; Methods for providing thin hydrogen separation membranes and associated uses; Inventors: Anand Chellappa, Thomas R. Vencill, W. Doyle Miller.

US 20130105307 A1; Hydrogen and oxygen generator; Inventors: Dejan Pavlovic and Nenad Pavlovic, Oct. 31, 2012.

None of the above works were able to make production of hydrogen be cost-effective i.e. recommended for industrial production.

Production of Hydrogen with Aluminum

Production of hydrogen from water can be considered a method of "crowding out" of hydrogen from water by active metals and alloys. Among the most promising of these metals is aluminum which is capable of radically solving this problem.

U.S. Pat. No. 6,440,385; Hydrogen generation from water split reaction; Aug. 27, 2002; Inventors: Asok C. D. Chaklader; Assignee: The University of British Columbia, discloses an attempt to generate hydrogen from water on demand by water decomposition reaction which has been partly successful in some newer developments. Aluminum was used to generate hydrogen from water, but is not very efficient, as this method requires large concentration of other materials in the aluminum to accomplish the water split reaction.

U.S. Pat. No. 4,308,248; Material and method to dissociate water; Dec. 29, 1981; Inventor: Eugene R. Anderson; Assignee: Horizon Manufacturing Corporation.

U.S. Pat. No. 7,144,567; Renewable energy carrier system and method; Dec. 5, 2006; Inventor: Erling Jim Andersen.

Aluminum is a very promising raw material for the production of hydrogen: it is cheap, very common on the planet and is very active oxidized in water. However, as discussed above, the oxidation process is stopped once the appearance of the oxide film on the aluminum surface, which makes it possible to use aluminum for food dishes but makes aluminum unsuitable for continuous hydrogen production. None of the foregoing patents disclose that anyone in the world succeeded with minimal cost (less than 1 kW/h) in making the oxidation of aluminum continuous.

Cavitation

Cavitation is the formation of cavities in the liquid (cavitation bubbles) filled with gas, vapor or a mixture thereof. Cavitation is the result of local reduction of pressure in the fluid, which can occur either by increasing its velocity (hydrodynamic cavitation), or in the passage of acoustic waves of high intensity during the half-life (acoustic cavitation).

U.S. Pat. No. 6,719,817 B1; Cavitation hydrogen generator; Apr. 13, 2004, Inventor: Daniel J Marin.

US 20120058405 A1; Cavitation assisted sonochemical hydrogen production system; Mar. 8, 2012, Inventors: Jenifer Jeong, et al.

Laborde J L (1998), Acoustic cavitation field prediction at low and high frequency ultrasounds.

The patents cited above strongly support effectiveness of the impact of acoustic cavitation process for hydrogen production. However, it requires energy to power the generator producing electrical impulses applied to the acoustic transducers (piezoelectric or magnetostrictive).

Sound Vibrations: Sound, Infrasound, Ultrasound, Hypersound

A person's hearing can perceive frequencies 16-18,000 Hz, which are called sound. But the world around us is filled with the sounds that lie above and below this range—infrastructure and ultrasounds. The lower boundary of the ultrasonic range is called the elastic vibrations of a frequency of 18 kHz. The upper limit is determined by the nature of elastic ultrasonic waves which can propagate only on the condition that the wavelength is much greater than the mean free path of the molecules (in gases) and interatomic distances (in liquids and gases). In gases, the upper limit is 106 kHz, and in liquids and solids, the upper limit is 1010 kHz. Typically, ultrasound is at a frequency of 106 kHz and higher frequencies are called hypersound. In many universities in the world, sound, in all its ranges of frequency, is a main tool in the study of liquid systems, including the process of rupture of hydrogen bonds.

U.S. Pat. No. 5,404,754: An ultrasonic detection of high temperature hydrogen attack; Inventor: Weicheng D. Wang.

Ionization

The ionization of water located in the cells that produce hydrogen is due to the pulsed discharge of electric current, supplied to the electrodes.

U.S. Pat. No. 5,149,407A; Process and apparatus for the production of fuel gas and the enhanced release of thermal energy from such gas; Inventor: Stanley A. Meyer; Publication date Sep. 22, 1992.

U.S. Pat. No. 5,616,221A; Electrolytic ionized water producing apparatus: Inventors: Hidemitsu Aoki, et al.

The Thermal Energy

The decomposition of water molecules in the hydrogen generator is most often due to an increase in rotational kinetic energy of the molecules and the energy of their oscillations. Thermal energy is just the kinetic energy of a molecular scale. Charging energy to increase the kinetic energy of the molecules is a micro hydraulic shocks sent into the liquid medium of the hydrogen reactor.

EP 2433902 A1; Method and device for producing combustible gas, heat energy, hydrogen and oxygen; Inventors: Partnou Yauheni Viktorovich; Publication date Mar. 28, 2012.

Plasma

The concept has emerged in the process of our research involves extensive ionization of hydrogen gas in the reactor, and in combination with high pressure and temperature identification with the plasma. Therefore, the works associated with the use of plasma for the decomposition of water molecules were at the center of our attention.

US 20090035619 A1; Methods and systems of producing molecular hydrogen using a plasma system in combination with an electrical swing adsorption separation system; Inventors: Charles Terrel Adams; Publication date Feb. 5, 2009, which is certainly of scientific interest, though created in the "low-temperature plasma" raises questions. Furthermore, unlike the hydrogen reactor, great advantage of which is the fact that its production is a completely environmentally friendly product, in this patent, the plasma system produces molecular hydrogen in the gas stream along with hydrogen and carbon monoxide.

U.S. Pat. No. 6,806,651 B1; High-density plasma source; Inventor: Roman Chistyakov; Pub: Oct. 19, 2004.

Membrane Technology

Assuming though that the gas mixture obtained at the decomposition of water may have a different purpose, we have provided methods for advanced separation and purification of gases, including gas mixture separation technology based on the action of a special kind of barriers (membranes) with selective permeability of the gas mixture components. In the broadest sense, the membrane should be understood as a non-equilibrium system open at the boundaries of different compositions which are supported shared mixtures under the influence of various factors (temperature, pressure, gravity or the magnetic field, centrifugal force). Separating capacity of the system depends on the properties of the membrane and separated mixture component properties as well as their interaction.

US 20060147763A1; Upflow microbial fuel cell (UMFC); Inventors: Largus Angenent, Zhen He; Publication date is Jul. 6, 2006.

U.S. Pat. No. 7,922,781 B2; Hydrogen generation apparatus and method for using same; Inventors: Anand S. Chellappa, Michael Roy Powell, Charles J. Call; Publication date: Apr. 12, 2011.

Catalyst

Most processes in the chemical industry today run using heterogeneous catalysts. Catalyst is a substance that accelerates the rate of a chemical reaction without entering it. In fact, among these substances may occur many chemical reactions. As a rule, a catalyst system "tuned" only for one of them. That is, each particular catalyst can accelerate only a single process.

EP 2571805 A1; A process for the production of hydrogen, the sequestration of carbon dioxide and the production of building materials starting from slags and/or industrial ashes; Inventors: Paolo Plescia, Enrico Barbarese, Maurizio Pinna; Publication date: Mar. 27, 2013.

Turbulence

Cause of turbulence in a hydrogen generator may be virtually any external influence directed to the liquid in the cell box.

Each of the frontal water waves propagating inside the hydrogen reactor during the motion loses energy, including passing through holes in electrodes turning in a relatively slow flow of water with a twist, which can be considered the turbulence, which helps to remove the gas bubbles from the surface of the electrodes.

RU2357109C1; Apparatus and method for influencing the vortex structures in turbulent air stream; Inventor: Ostrikov Nicholas; 07.11.2007.

SUMMARY

It is an object of the present invention to provide an improved apparatus for decomposition of water into hydrogen and oxygen for use in internal combustion engines and production of the electricity.

It is another object of this invention to create a device that would provide humanity with a sufficient amount of low-cost and environmentally friendly fuel.

The present invention provides a multifactorial hydrogen reactor with elevated hydrogen production (e.g., over the proposed electrolytic cell of U.S. Pat. No. 8,075,748), due to complex set of the following sixteen (16) physical and chemical processes, acting simultaneously on the hydrogen bonds in aqueous solutions of electrolytes and accelerating the hydrogen production process:

Electrolysis. Only the hydrogen reactor described herein is able to solve the problem of the cost of hydrogen generation using electrolysis, by the combination of new methods and technology solutions.

Production of hydrogen with aluminum. Aluminum has become the primary active metal in our hydrogen reactor. In a hydrogen reactor, the oxide film on aluminum is continuously removed under the action of a series of electro-hydraulic shocks. An advantage of our hydrogen reactor compared with U.S. Pat. No. 6,440,385 is that in our reactor, there are no other reactants and reaction products, but only hydrogen and oxygen. For the first time in the world, continuous hydrogen production was achieved in our hydrogen reactor.

Cavitation. Cavitation process in this hydrogen reactor occurs when the frontline or frontal water wave of the electro-hydraulic shock waves passes through the holes in the electrolyzer's electrodes. An advantage of our hydrogen reactor is that cavitation therein is a byproduct of the electro-hydraulic shock aimed at removing the oxide film and the effect of the shock wave, which passes through the holes of the electrodes creates a powerful cavitation effect.

Sound vibrations as sound perceived by humans. In the hydrogen reactor, sound in a wide frequency range occurs when a shock wave passes through the holes in the electrodes forming gas bubbles. In this hydrogen reactor, acoustic vibrations of different frequencies: infrasound, sound, ultrasound, hypersound, caused by the passage of the frontline water wave through the holes in the electrolyzer's electrodes.

Ionization. The ionization of water located in the cells that produce hydrogen is due to the pulsed discharge of electric current, supplied to the electrodes.

The thermal energy. The decomposition of water molecules in the hydrogen generator is most often due to an increase in rotational kinetic energy of the molecules and the energy of their oscillations. Thermal energy—it's just the kinetic energy of a molecular scale. Charging energy to increase the kinetic energy of the molecules is a electro-hydraulic shocks sent into the liquid medium of the hydrogen reactor.

Plasma. In our hydrogen reactor, the impact of electro-hydraulic shock in distributed microscopic fluid generates powerful light emission, the pressure in the tens of thousands of atmospheres and temperatures of several thousand degrees, all of this is certainly a cause and a consequence of plasma formation under the influence of electro-hydraulic shock.

Membrane Technology. Assuming though that the gas mixture obtained at the decomposition of water may have a different purpose, we have provided methods and advanced separation and purification of gases including mixtures of gas separation technology based on the action of a special kind of barriers (membranes) with the selective property permeability gas mixture components. In the broadest sense, the membrane should be understood a non-equilibrium system open at the boundaries of different compositions which are supported shared mixture under the influence of various factors (temperature, pressure, gravity or the magnetic field, centrifugal force). Separating capacity of the system depends on the properties of the membrane and separated mixture component properties as well as their interaction.

Catalysis. Most processes in the chemical industry today run using heterogeneous catalysts. Catalyst—a substance that accelerates the rate of a chemical reaction without entering it. In fact, among these substances may occur many chemical reactions. As a rule, a catalyst system "tuned" only for one of them. That is, each particular catalyst can accelerate only a single process. During the development of our hydrogen reactor, a variety of catalysts have been used, including coverage of the platinum group metals, and various composite materials, but titanium was preferred.

Turbulence. Each of the microwave fronts propagating inside the hydrogen reactor during the motion loses energy, including passing through cavitators turning in a relatively slow flow of water with a twist, which can be considered the turbulence, which helps to remove the gas bubbles from the surface of the electrodes.

The electrostatic field. The electrostatic field inside our hydrogen reactor is created by potential difference voltage (10-12 volts) supplied to the vessel, where the minus applied to body container and the plus to the lid of the body, which is insulated from the container. The negatively charged hydrogen ions will move toward the positively charged cover, where there is an outlet for hydrogen.

Electromagnetic field. In the hydrogen reactor, under the influence of electro-hydraulic shock occurs the excitation of the weak quasi-static and low-frequency electromagnetic fields. Their nature is so far poorly understood, but neglecting their influence on the decomposition of water molecules would be unwise.

The light energy. Well-known fact in science is that the light energy is an effective tool for the decomposition of water molecules. Accordingly, in our hydrogen reactor, the light energy of the plasma arising due to electro-hydraulic shock makes a significant contribution to the production of hydrogen.

This hydrogen reactor, in which energy costs for electrolysis compensated by a parallel reaction can solve the problem of an unlimited hydrogen production at a price of 90 cents per 1 kg, which is 3-4 times lower than existing today in the world prices for hydrogen. When used for industrial production of hydrogen, our hydrogen reactor can guarantee global transition to "green" energy technologies.

In order to reduce energy costs in our reactor we merged two chemical reactions—exothermic and endothermic—the products of which are hydrogen.

These reactions are:

$Al + 2H_2O \rightarrow Al-OOH + 3/2 H_2 + Q_1.$ $2H_2O \rightarrow 2H_2 + 2O - Q_2.$ In these reactions, $Q_1$ and $Q_2$ have the same magnitude and substantially cancel each other.

The heat required for the electrolysis reaction: $2H_2O \rightarrow 2H_2 + 2O - Q_2$ is obtained by the reaction of the oxidation of aluminum: $Al + 2H_2O \rightarrow Al-OOH + 3/2 H_2 + Q_1$.

The heat required for the electrolysis reaction, which is coming from the oxidation of aluminum is continuously supplied as aluminum oxide film continues to be destroyed by the electro-hydraulic shock.

The oxidation of aluminum in the water would already ensure the production of hydrogen in virtually unlimited quantities, but the oxide film formed on the surface making this route unprofitable.

We have fully solved this problem. The method we used is the electro-hydraulic shock effect which occurs in liquids such as water, with electric discharge therein, and is an electric explosion in the liquid with substantially instantaneous release of energy at a given point. Number and rate of allocated kinetic and thermal energy in the electric discharge area depend on many factors, including the parameters of the electrical discharge and fluid properties. Electro-hydraulic effect generates shock waves in the liquid at breakdown. Electro-hydraulic shock is a complex set of phenomena. In its first step, lasting microseconds, a plasma channel is formed at a temperature of 40,000° C. The plasma expands at a speed commensurate with the speed of sound in water (1410 m/sec).

This forms the first shock wave and the cavity is filled with hot steam and gas, which gradually completes its expansion, then begins to throb and eventually collapses. As a result, decomposition and ionization of molecules occurs in the resulting plasma along with concomitant light radiation, shock waves, intense sound waves in a wide frequency range, as well as cavitation and pulsed electromagnetic fields.

In our reactor electro-hydraulic shock is used to remove oxidation film from the aluminum making oxidation of aluminum and production of the hydrogen uninterrupted until all aluminum is oxidized by transforming this momentum into a sequence of low-power pulses distributed to 42 electrodes.

Due to this effect in the hydrogen reactor electro-hydraulic shock on the water molecules is carried out not by the entire volume of the device but in each individual "point." This means that the device creates the so-called local centers of the decomposition of water molecules.

In our hydrogen generator, the local energy centers affect micro-volumes that allow the temperature to rise, or more precisely, to increase the kinetic energy of the molecules exclusively in the particular microscopic volumes, in which an avalanche process of decomposition occurs due to the ultra-high pressure and temperature.

In general, the phase transition of water is characterized by the formation of local centers of a new phase in the initial phase. For example, the transition of liquid water to ice is proceeded by the formation of ice nucleation as local centers of crystallization.

Figure 11:
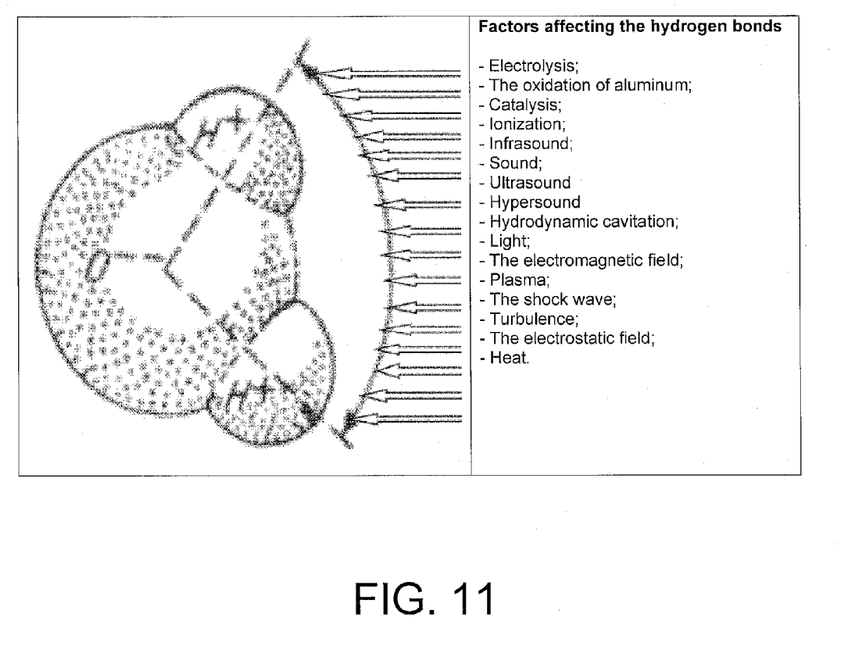
FIG. 11 presents the physical and chemical processes that affect hydrogen bonding of water molecules.

For the first time in one device—our hydrogen reactor, we were able to combine sixteen different physical-chemical means to affect hydrogen bonding of water molecules. FIG. 11 presents the physical and chemical processes that affect hydrogen bonding of water molecules in a hydrogen reactor created by us.

Thus in the hydrogen reactor we were able to replace energy "swapping" of all the above mention processes with the single pulses, with help of the set of "converters" placed in the reactor to convert mechanical, sound, light, electricity and electromagnetic energy.

A special role is played here by the electrostatic field that will cause the dipoles of water molecules to rotate in the direction of the electrodes by its poles.

Calculations show that for the production of 1 kg of hydrogen requires oxidizing of 9 kg aluminum. Therefore to simplify the calculations of performance reactors, cartridges of hydrogen reactor designed to produce different amounts of hydrogen must have a weight of multiples of 9 kg (9, 18, 27, 36, 45, etc.) kg.

In our hydrogen reactor, electro-hydraulic shock is implemented through electrodes. In order to avoid "run-off" charge, the ends of the electrodes have the shape of a hemisphere.

A petrol engine with 180 hp (134) kW fueled part of the oxygen-hydrogen mixture produced in the hydrogen reactor has a volume of 8 liters per minute in the overall performance of the prototype 30-32 liters per minute.

Pure hydrogen at (22-25) liters per minute passed through membrane filters and was stored with a further compression for the intended use. The rotary movement of the cardan shaft of the engine transmitted an electric power capacity of 120 kW to the rotor.

Electricity produced can be redistributed between the consumer and the power system of the hydrogen reactor at a ratio of 11:1 i.e. 110 kW received the consumer, and spent 10 kW to power the pulse generator designed for the implementation of the electro-hydraulic shock and charging the battery supply of electrolyzer chain.

Testing of the hydrogen reactor was carried out over several series of 10 hours. The products of each series were 1,200 kW/h of electricity and 18,000 liters of pure (99.9%) of hydrogen under normal conditions. The average value of the costs of the entire series of tests was 2 gallons of gasoline, or about $8, the cost of 20 pounds of aluminum is $0.78×20=$15.6. Thus the production of 1,200 kW/h of electricity and 18,000 liters of pure (99.9%) of hydrogen under normal conditions cost $23.6. Since one liter of hydrogen weighs 0.0899 grams, the total weight of hydrogen produced was 1618.2 grams. Consequently, even a prototype hydrogen reactor can produce hydrogen at $0.9 per kilogram and electricity at $0.0183 i.e. by 1.9 percent.

Serial produced hydrogen reactors still will be able to reduce the above-mentioned prices by a factor of 10.

The oxidation of aluminum, produced in the hydrogen reactor, i.e., production of hydrogen, may be 10-20% greater when bauxite or alum earth are used as reagents.

The big advantage of the hydrogen generator is the fact that produced hydrogen can help store energy generated by power plants at night and on weekends, as well as renewable energy sources (solar, wind).

BRIEF DESCRIPTION OF THE DRAWINGS

The forgoing aspects and many of the attendant advantages of this invention will become more appreciated as the same becomes better understood by reference to the following detailed description, when taken in conjunction with the accompanying drawings, wherein.

DETAILED DESCRIPTION

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Expecting that the gas mixture obtained in dissociation of water may have different purposes, we provide modern methods of separation and purification of gases, including mixtures of gas separation technology, based on the action of a special kind of barriers (membranes) possessing selective permeability properties of the gas mixture components.

As described herein, the hydrogen reactor combines two processes each of which produces hydrogen: (i) electrolysis producing a hydrogen-oxygen mixture (Brown's Gas) and (ii) oxidation reaction. Therefore, there are two types of consumers—diesel or petrol engine, for which gas mixture and storage are preferable, which for technological and safety reasons requires pure hydrogen.

The Use of Hydrogen Reactor

The hydrogen reactor of this invention can be used in two main areas:

1. For hydrogen production, followed by compression, storage and transport to the place of consumption in vehicles or pipelines.
2. For the production of electricity with a further transformation in all possible forms of energy (mechanical, electromagnetic, sound, light and chemical).

In this case, the source of energy is close to the consumer, allowing the user to save enormous material resources by eliminating the need for costly transmission lines, as well as raising and lowering transformer substations.

Hydrogen produced by the hydrogen reactor can be used as basic fuel for the newly constructed facilities, and optionally for the existing ones using fossil fuels (oil, natural gas, coal) for processes requiring heat.

In this case, the hydrogen can provide (80-90) % saving of primary fuel and can dramatically alter the ecological situation in the region by reducing harmful emissions into the atmosphere.

One of the important advantages of hydrogen energetics is that it provides savings using the existing energy infrastructure facilities.

Thus hydrogen, either in pure form or mixed with other fuels, can be effectively used in nuclear power plants, solar plants, nuclear aircraft carriers, nuclear-powered ships (civilian or military), nuclear submarines, coal-fired power plants, power plants using natural gas, on diesel power generation plants, biofuels, waste incineration plants, in all the modes of transport: water, rail, road, including freight etc.

The market volume of world hydrogen production is estimated at 53-55 million tons in 2013. Asia and the Pacific region is the largest producer of about 40% of world production of hydrogen. The region produces about 20-21,000,000 tons of hydrogen per year. In addition, Asia and Pacific region are the largest market customers of hydrogen. Europe and Eurasia is the second largest producer, followed by North America, which comes third.

Major benefits of the hydrogen reactor of this invention:
1. The main obvious advantage of a hydrogen reactor is hybrid conversion in internal combustion engines to save on gas.
2. Unlike fossil fuels, hydrogen is produced in a hydrogen reactor from water.
3. It lowers the consumption and saves on combustion of fuel.
4. Hydrogen produced by a hydrogen reactor doesn't require any storage.

5. It does not require any contained pressure in heavy cylinders like compressed natural gas (CNG).
6. If a hydrogen reactor is used on trucks and small vehicles, there will be a huge increase in fuel savings and fewer trips to gas station.
7. Burning garbage or unburned leftovers of garbage has always been a problem for industrial or municipal incinerators. The specific heat of hydrogen can lower the moisture content from 50% to 30% of unburned garbage because hydrogen burns faster and hotter which helps to boost combustion of garbage completely.
8. If a hydrogen reactor is coupled with solar, it will increase the efficiency of production of hydrogen.
9. A hydrogen reactor is 100% carbon free technology.
10. A hydrogen reactor solves and lowers hazardous air pollutants and gas emissions of particulates related to coal and diesel.
11. A hydrogen reactor can work with all types of fuel including gasoline, propane, natural gas, coal, clean coal, diesel, biofuel, bio diesel, biomass, ethanol, solar, etc.
12. The following fields and sectors could extremely benefit from using a hydrogen reactor: energy sector, automotive industry, home appliances, waste treatment, environment, health, safety, community development etc.
13. The produced hydrogen from a hydrogen reactor will boost internal combustion engine's performance while preventing smog and damage on the engine.
14. People can benefit from the tax refunds owed to them by law for using green technology.
15. Multi-process hydrogen reactor development will bring new discoveries, new products and services to the market.

Figure 1:
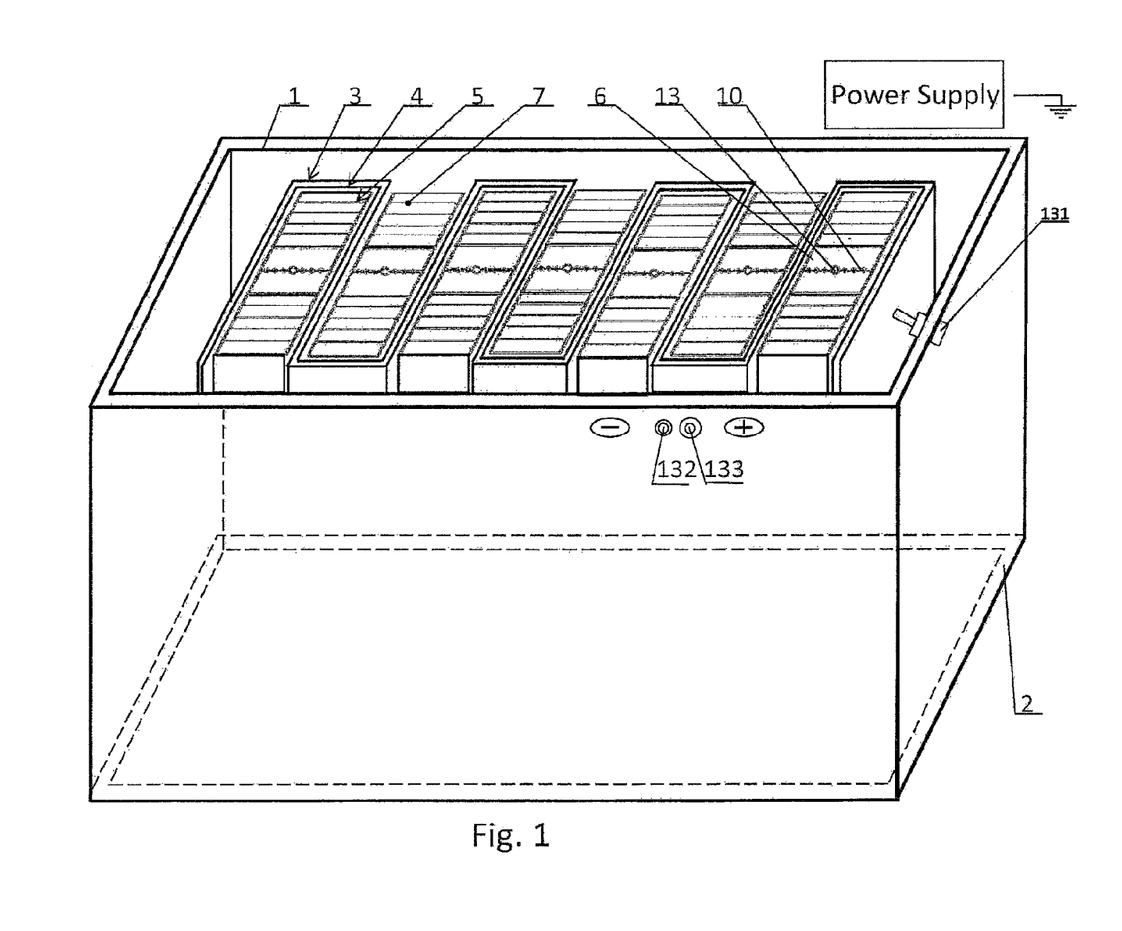
FIG. 1 is a schematic top view of the housing body/corpus of the multifunctional hydrogen reactor in accordance with the present invention.

FIG. 1 shows a general view of a working prototype of a multifactorial hydrogen reactor. The reactor housing/corpus 1 is a closed vessel. It is shaped like a parallelepiped with sides of 24"×12"×9". If necessary, frame size can be increased proportionally. The reactor housing is made of titanium sheet 3-5 mm thick, and can also be made of nickel, titanium and platinum group metals (PGMs). Its inner walls serve as catalysts in the chemical reactions occurring in the reactor. Dielectric isolation gasket 2 made of teflon thickness min. ¼"; it covers the entire bottom of the device; it can sustain high temperature and is not involved in the process of reaction of the device.

Figure 8:
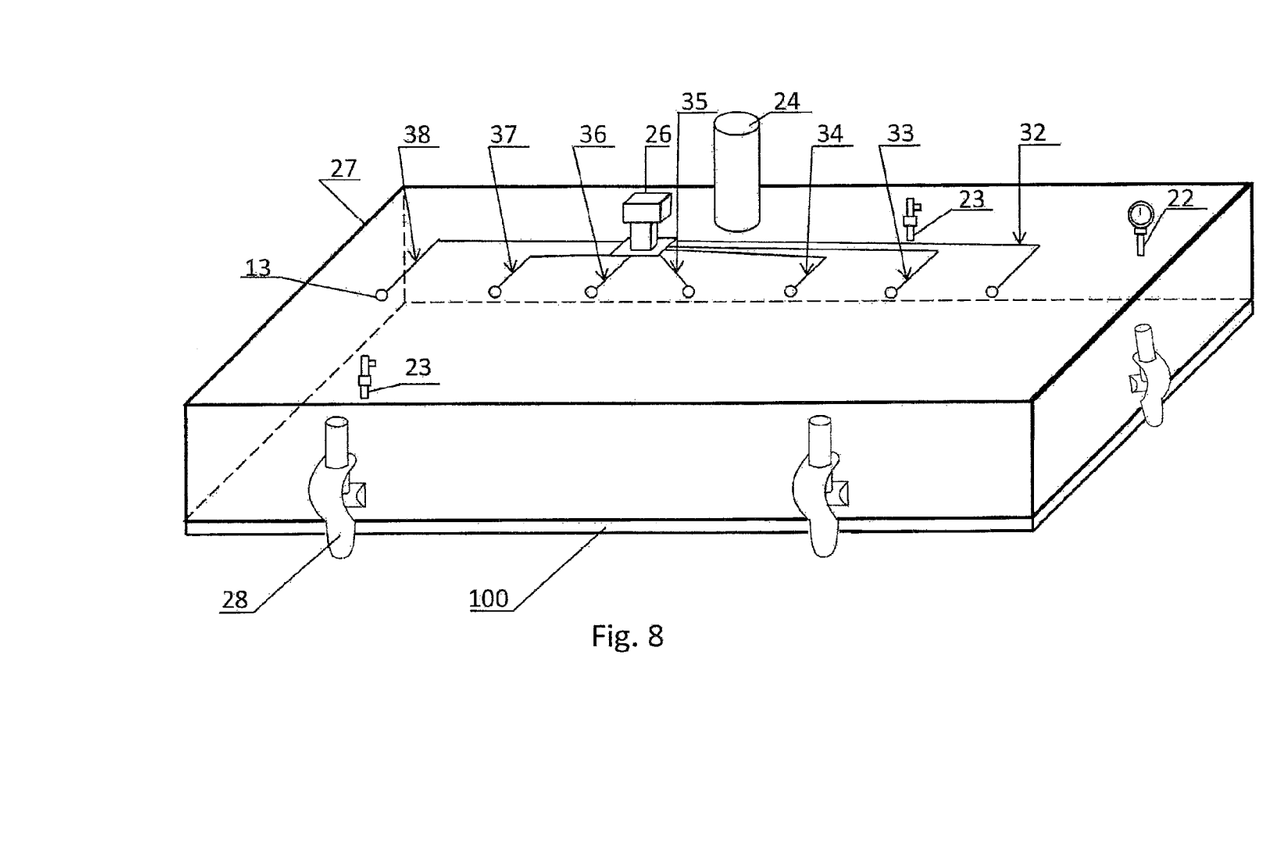
FIG. 8 is a schematic side view of the lid of the multifactorial hydrogen reactor in accordance with the present invention.

With reference to FIG. 1 and FIG. 8, the major parts of the hydrogen reactor are power supply, electrolyzer's system including electrodes 3 & 4, which can have the form of rectangular serpentine springs, perforated aluminum plates 7 and water, cartridges 5 holding perforated aluminum plates, and electro-hydraulic electrodes holder 6. The electro-hydraulic electrodes holder 6 has vertical openings/ports and a parallelepiped shaped technological rectangular cavity hollowed out along the diagonal of the body or at an angle of 45 degrees to the bottom surface of the housing. The hydrogen reactor also has high voltage multipin connectors 13, dielectric isolation gasket 2 covering entire floor of the reactor, means for electrically connecting the positive and negative electrodes to the power source, corpus lid 27, closure 28, the thermometer and pressure sensor—tridicator boiler gauges 22 located on the surface of the lid 27, high pressure release valve 23 for adjusting the pressure inside of hydrogen reactor, exhaust pipe or tube 24 through which hydrogen is supplied to the consumer, and an electro-impulse dispenser 26 which transmits impulses to the electrolyzer's electrodes synchronously through high voltage multipin connectors.

Electrolyzer's electrodes 3 & 4 and perforated aluminum plates 7 accelerate the oxidation of aluminum, where the electrodes 3 & 4 convert the electro-hydraulic shock waves into the sound vibrations over a wide frequency range.

Figure 2:
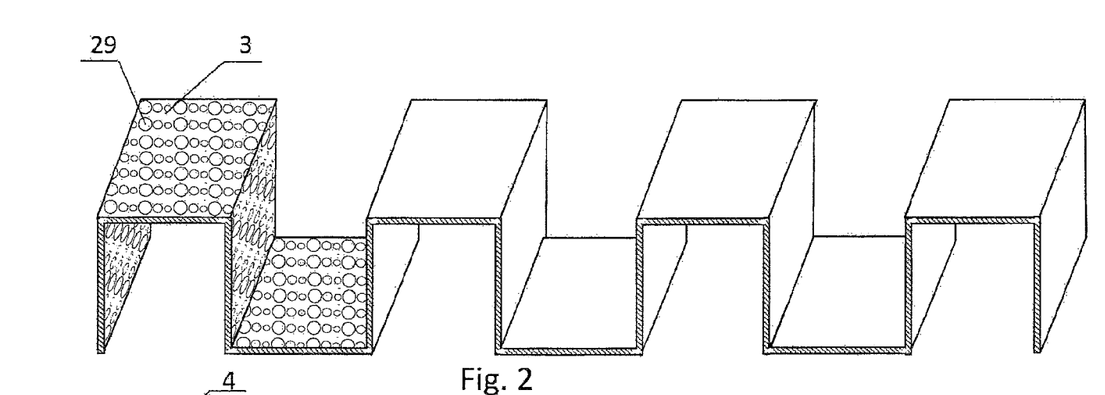
FIG. 2 shows a schematic view of the first electrolyzer's electrode.
Figures 3, 4:
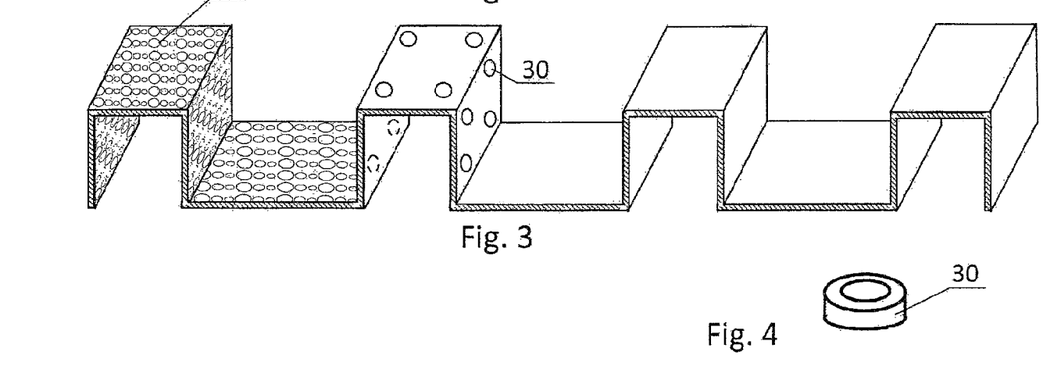
FIG. 3 shows a schematic view of the second electrolyzer's electrode.
FIG. 4 shows a schematic view of the one of the proposed shapes of gaskets, which space apart the two electrodes of the FIG. 2 and FIG. 3.

Electrolyzer's electrodes 3 and 4, FIG. 2 and FIG. 3 accordingly, at the same time are titanium catalysts and cavitators in the cavitation reaction. The electrolyzer comprises electrodes 3 and 4 put together with gaskets 30, FIG. 4 submerged in the water. Electrodes 3 and 4 made of perforated titanium sheet, and can also be made of nickel, titanium and platinum group metals (PGMs). Power is supplied to the electrodes 3 and 4 by power wires, where one of the electrodes is the anode and the other one of the electrodes is the cathode. The intensity of the process, according to the laws of Faraday, is directly proportional to the amount of electrical charge passing through the electrolyte as electrical current in the circuit. The chosen configuration of electrodes 3 & 4, which consists of seven sections and the series connections of these sections in accordance with Ohm's law, allows all the electrodes to have the maximum current from the power source. The configuration or the geometric shape of the anodes and cathodes are in the shape of a rectangular serpentine spring.

Hydrodynamic cavitation occurs during the passage of the shock wave through the holes of electrolyzer's electrodes 3 & 4, providing additional energy, said energy contributes to the breaking of hydrogen bonds, wherein said electrodes 3 & 4 are also cavitators in cavitation process.

The cavitation effect was achieved through the holes in the electrodes, with these holes covering the entire surface of the electrodes 3 & 4. The holes are made in three different diameters: 4, 6 and 8 mm alternately, covering the entire surface of the electrodes 3 & 4 (see 29, FIG. 2). Prerequisite for intensive decomposition of water molecules is also the clearances between the electrodes 3 & 4. But the process of cavitation occurs due to the main cartridge 5, FIG. 5. Seven cartridges 5 inserted into the cells/openings formed by the shape of electrodes 3 & 4.

Figure 10:
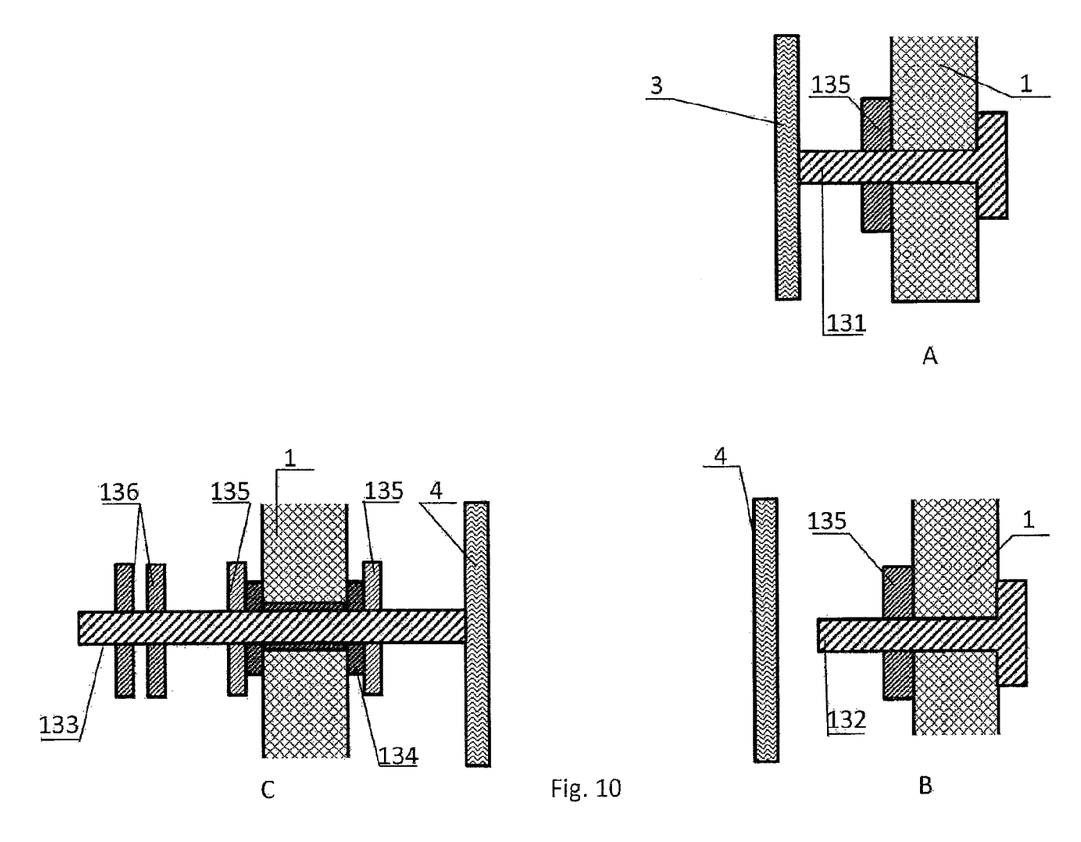
FIG. 10 is a schematic view of the negative and positive charges of power connected to the electrolyzer's electrodes through housing/corpus of the reactor.

FIG. 10 shows a schematic view of the negative and positive charges of power connected to the electrolyzer's electrodes through housing/corpus of the reactor. Positive voltage is applied on the rod 133, therefore, it must be insulated from the housing/corpus of the reactor; it only contacts the electrode 4—anode. The rod 133 also passes through the corpus/housing of the reactor without touching it using the dielectric sleeve 134, which is located within the housing. Two nuts 135 fix sleeve 134 from different angles or directions. The diameter of nut 135 is greater than the diameter of sleeve 134. Nuts 135 are made from dielectric material. Metal nuts 136 attach wire to the anode (positive). 131 and 132 are the bolts with the nuts. A bolt 132 passes through an opening in the housing; where the bolt head is located inside the reactor; where the bolt head size is 2.5 cm and the entire length of the bolt with its head is 3.6 cm or 7.6 cm. Bolt 132 does not touch electrode 4—anode. An electric current is provided to a bolt 132 on the outside of the reactor housing via negative wire. Bolt 132 supplies a negative charge of electricity to the body of the reactor; a negative charge of electricity is supplied to the bolt 131 from the body, which passes through the opening in the housing of the reactor; bolt 131 is in contact with the housing of the reactor and is in direct contact with the electrolyzer's electrode 3—cathode. Thus, electrode 3 has a negative charge of electricity and is the cathode.

The advantage of our hydrogen reactor is that cavitation therein is a byproduct of the electro-hydraulic shock waves aimed at removing the aluminum oxide film and which pass through the holes of the electrodes 3 & 4 creating a powerful cavitation effect. In this hydrogen reactor, acoustic vibrations of different frequencies (infrasound, sound, ultrasound, hypersound) are caused by the passage of the frontline water wave through the holes in the electrolyzer's electrodes 3 & 4, said holes covering the entire surface of the electrodes and having three different diameters: 4, 6 and 8 mm respectively.

Sound in a wide frequency range occurs when the electro-hydraulic shock waves pass through the holes of the electrodes forming gas bubbles. This is achieved due to the process, which takes place in forty two (42-x) distributed volumes of the hydrogen reactor under the effect of the electro-hydraulic shocks, forming local micro-cavities with pressures in the hundreds of thousands of atmospheres and a temperature of several thousand degrees (plasma).

Figure 6:
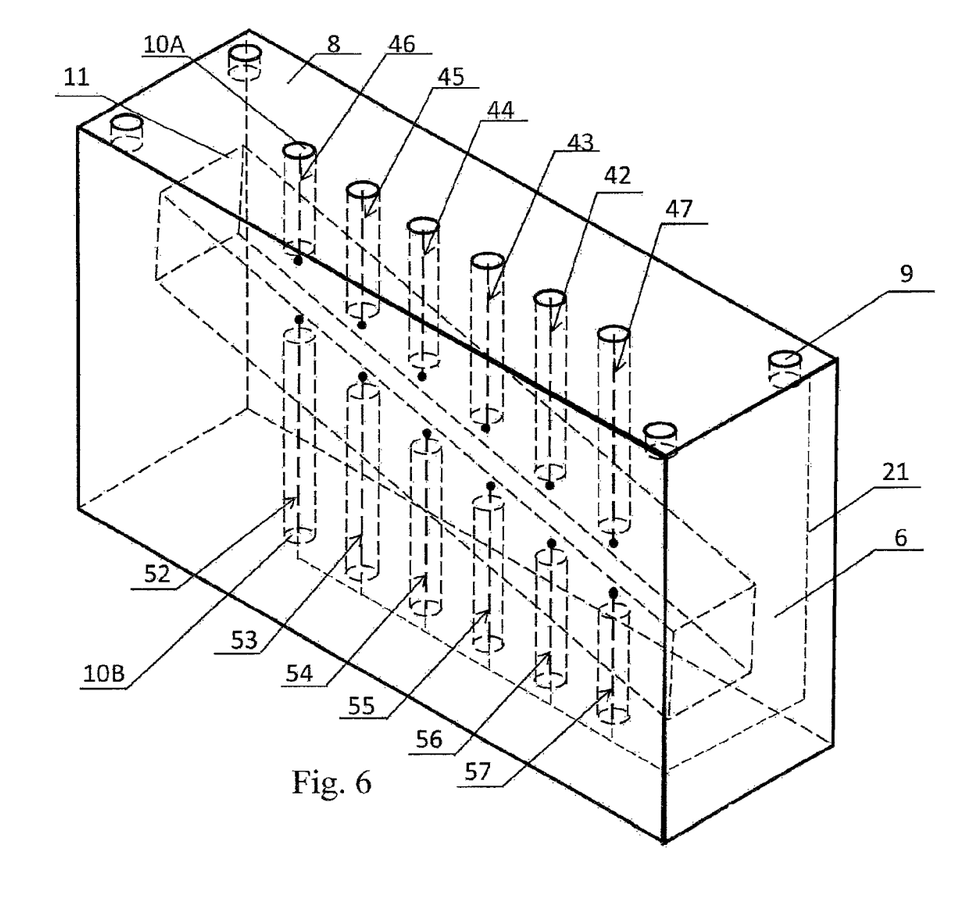
FIG. 6 is a schematic side view of electro-hydraulic electrodes holder 6.

The formation of all processes in the hydrogen reactor due to the electro-hydraulic shocks include the fact that frontline water wave pressure occurs in forty two (42) distributed micro-volumes of the electro-hydraulic electrodes holder 6.

Forty-two distributed micro-volumes are achieved by multiplying seven electro-hydraulic electrodes holders 6 by six electrodes 42-47 inserted into the vertical openings or ports 10A, FIG. 6 in each of said frames.

Frontline water wave pressure passing through holes in the electrodes—cavitators 3 and 4 creates a microenvironment of subsonic, sonic and ultrasonic vibrations, heat, ultrasound, hydrodynamic cavitation, turbulence, high-pressure, chemical catalysts, light energy, electrostatic and electromagnetic fields, i.e. instantaneous release of energy in the empty cavity of electro-hydraulic electrodes holder 6. This process creates these effects using an electronic impulse distributor 26, FIG. 8, where the electrodes create an electro-hydraulic shock. It causes a complex set of phenomena, which lasts for a microsecond, to form plasma, light emission, shock waves, sound waves, as well as cavitation and pulsed electromagnetic fields.

Infrasonic, sonic, and ultrasonic vibrations that, along with the heat, ultrasound and hydrodynamic cavitation, turbulence, high-pressure, chemical catalysts, light energy, electrostatic and electromagnetic fields, dramatically increases the process decomposition of water molecules.

Figure 5:
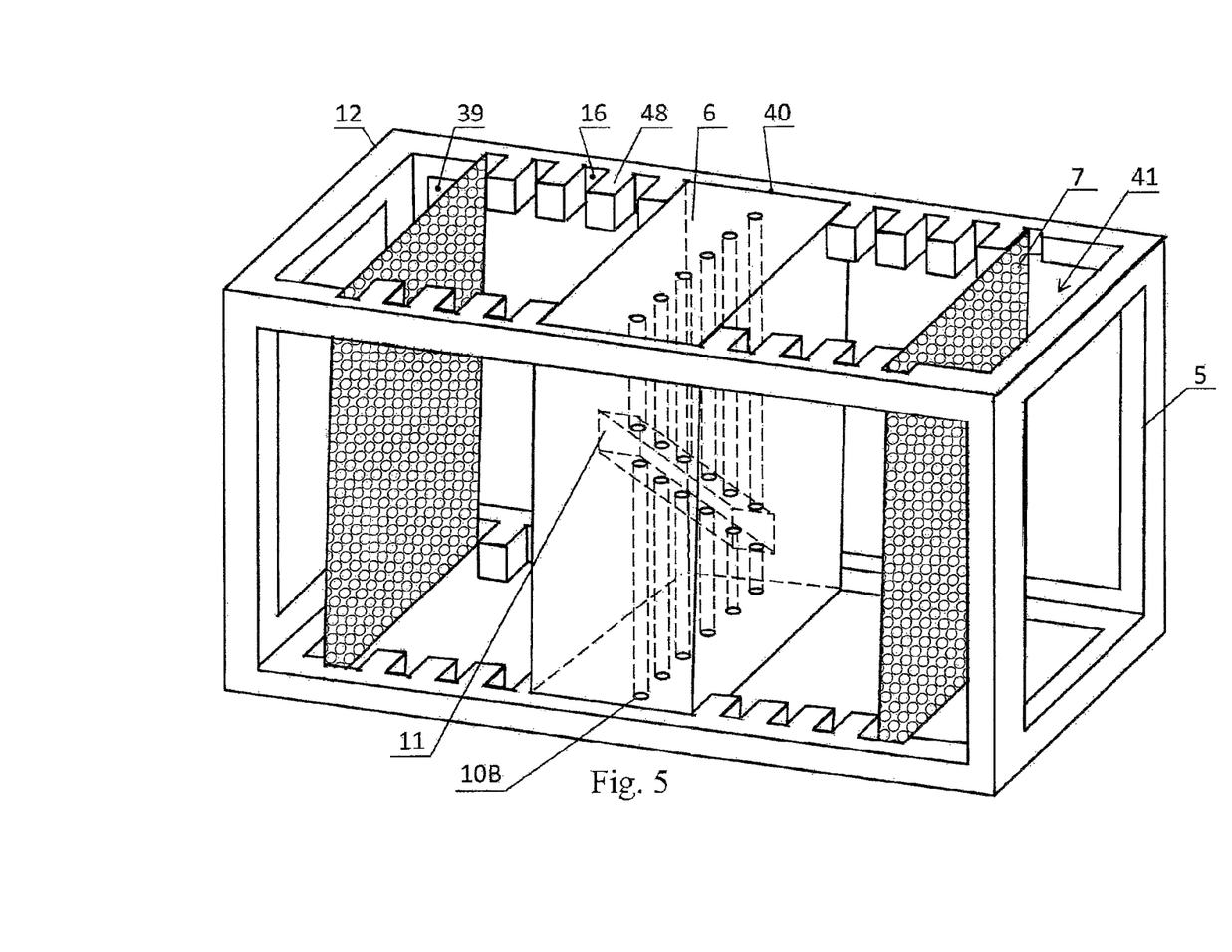
FIG. 5 is a schematic view of the cartridge 5.

One of the major works performed by the electro-hydraulic shocks is that the oxide film covering the aluminum plates 7, FIG. 5, is broken by electro-hydraulic shock. Formation of an oxide film on the aluminum surface is a natural process. Thus, the electro-hydraulic shocks disrupt the oxide film allowing continuing uninterrupted oxidation reaction of reactive metals, in this case aluminum. The oxidation of aluminum does not stop or interrupt due to the disruption of the oxide film by electro-hydraulic shocks and therefore, the process continues until the complete oxidation of the full volume of the aluminum of the cartridge and thus until the complete release of hydrogen.

Our hydrogen reactor combines two chemical reactions: exothermic and endothermic, the products of which are hydrogen.

All the processes occurring in this reactor: the allocation of light energy, heat, high pressure, ionization of the liquid, the acoustic effect, and cavitation, etc. occurring simultaneously results in intensive breaking of hydrogen bonds.

Parallel exothermic and endothermic reactions occurred in the process of electrolysis. The heat required for the electrolysis reaction: $2H_2O \to 2H_2+2O-Q_2$ is obtained by the reaction of the oxidation of aluminum: $Al+2H_2O \to Al-OOH+3/2H_2+Q_1$. The heat required for the electrolysis reaction, which is coming from the oxidation of aluminum is continuously supplied as aluminum oxide film continues to be destroyed by the electro-hydraulic shock.

FIG. 2 shows electrode 3, made of perforated titanium, with thickness 1.5-2 mm. FIG. 3 shows electrode 4, made of perforated titanium, with thickness 1.5-2 mm. Electrode 3 is the anode, the other electrode 4 is the cathode. The configuration or the geometric shape of the anode and cathode is made in the shape of a rectangular serpentine spring. Titanium catalyst electrode 3 at the same time is the catalyst; it is made of titanium sheet. The cavitation effect is achieved by holes 29, made in three different diameters: 4, 6 and 8 mm alternately, covering the entire surface of the electrodes 3 & 4. A chosen configuration of electrodes 3 & 4 comprises seven sections and the series electrical connection of these sections. Size and shape of electrodes 4 are made accordingly to be inserted into electrode 3. Distance between electrodes 3 & 4 is 1.5 mm, which is achieved by gasket 30, FIG. 4. Gasket 30 prevents contact between electrodes 3 & 4 and is made of dielectric material. FIG. 4 shows one suggested shape of gasket 30, but gasket 30 may have any shape. Its thickness is 1.5 mm, and it could be made of teflon, ceramic, porcelain, etc. Each section of the cartridge may contain minimum four gaskets. Voltage is supplied to electrodes 3 and 4. Electrolyzer is composed of electrodes 3 and 4, together with gaskets 30, submerged in the water, where electrode 3 is the anode, and electrode 4 is the cathode. Electrodes 3 and 4 are also catalysts. Hydrodynamic cavitation occurs during the passage of the shock wave through the holes of electrolyzer's electrodes providing additional energy which contributes to the breaking of hydrogen bonds, wherein said electrodes are also cavitators in the cavitation reaction. Thus, the hydrogen reactor implements electro-hydraulic shock waves through electrodes 3 & 4.

Configuration of electrolyzer's electrodes 3 & 4 was determined based on the functional requirements laid down in the hydrogen reactor; electrodes 3 & 4 are made of titanium and perform the functions of actual electrodes, catalysts and cavitators.

As is known electrolysis is a redox process. Electrolysis in our reactor takes place at the electrodes using the flow of direct electrical current through the electrolyte solution or the molten electrolyte.

FIG. 5 shows the frame 12 of the cartridge 5 made of a dielectric material. The process of cavitation occurs due to the main cartridge 5. This reactor has seven cartridges 5. Frame of the cartridge 5 has 3 sections/chambers: 39, 40 and 41. Each section/chamber carries out its function. Ledges 16 and 48 together create cavities which include perforated aluminum plates 7, which are parallel to each other. Sections/chambers 39 and 41 have four plates 7 each, therefore, each cartridge 5 having eight aluminum plates 7. Four plates 7 to the left and four plates 7 to the right of the electro-hydraulic electrodes holder 6. Six ports/opening 10A with inserted electrodes 42-47 multiplied by seven sections of electrode 4 inserted into electrode 3, FIGS. 2 & 3 create forty-two (42) micro-volumes. Electro-hydraulic electrodes holder 6 is inserted in the section/chamber 40 of the cartridge 5 and is located in the middle of the frame 12.

FIG. 6 shows a six-discharge electrode assembly in the electro-hydraulic electrodes holder 6 for alternately inducing electro-hydraulic percussion or shock. This reactor has seven electro-hydraulic electrodes holders 6. Electro-hydraulic electrodes holder 6 is made of a dielectric material. It is in the form of a parallelepiped. It has technological rectangular cavity 11, which extends across three quarters of the electro-hydraulic electrodes holder 6. Technological rectangular cavity 11 is hollowed out along the diagonal of the body 8 or at an angle of 45 degrees to the bottom surface of the housing 8. In the body 8 of electro-hydraulic electrodes holder 6 six vertical ports 10A are arranged uniformly from the top of the frame, where vertical ports 10B are arranged uniformly from the bottom. They serve as nests for electrodes with six electrodes inserted at the top and six electrodes at the bottom in each of seven electro-hydraulic electrodes holders 6. Then, all the electrodes are inserted through the lid 31, (see FIG. 7), which is top part of the electro-hydraulic electrodes holder 6.

Synchronicity of the impulse is according to the number of electrodes 42-47, FIG. 6. The whole process continues without interruption because aluminum plates 7 are not covered by the oxidation film due to oxidation film being continuously broken by electro-hydraulic shock. That is, the oxidation process of aluminum occurs but the oxide film formed on the aluminum plates 7 gets broken by electro-hydraulic shocks and the plates continue to displace hydrogen from water. The ends of the electrodes 42-47 working in the hollow cavity 11 should have hemispherical shapes so that the charges would not discharge. In this hydrogen reactor electrohydraulic percussions implemented through electrodes 42-47.

Process continues without interruption due to the fact that the aluminum plates 7 are not covered by the oxidation film. Ports 10A and 10B are for electrodes. Length of them changed proportionally along the line of the rectangular cavity 11. Depending on the angle of the rectangular cavity 11, length of the ports 10A, ports 10B and electrodes 42-47 changes. The interelectrode distance (the distance between the heads-up of electrodes) in the center of the rectangular cavity 11 is 1.5-2 mm. Electrode heads must be semi spherical. Negative wire 21 is connected to all six electrodes installed at the bottom of electro-hydraulic electrodes holder 6 in sequence.

Due to the electro hydraulic shock formed when submitting an electrical pulse to the electrodes 42-47 and 52-57 of electro-hydraulic frame 6, there is electro-hydraulic effect that accompanied by the formation of plasma and release of light energy, heat, high pressure and ionization of the liquid.

This powerful electro-hydraulic shock distributed by forty two (42) electrodes powered by a pulse generator.

Figure 7:
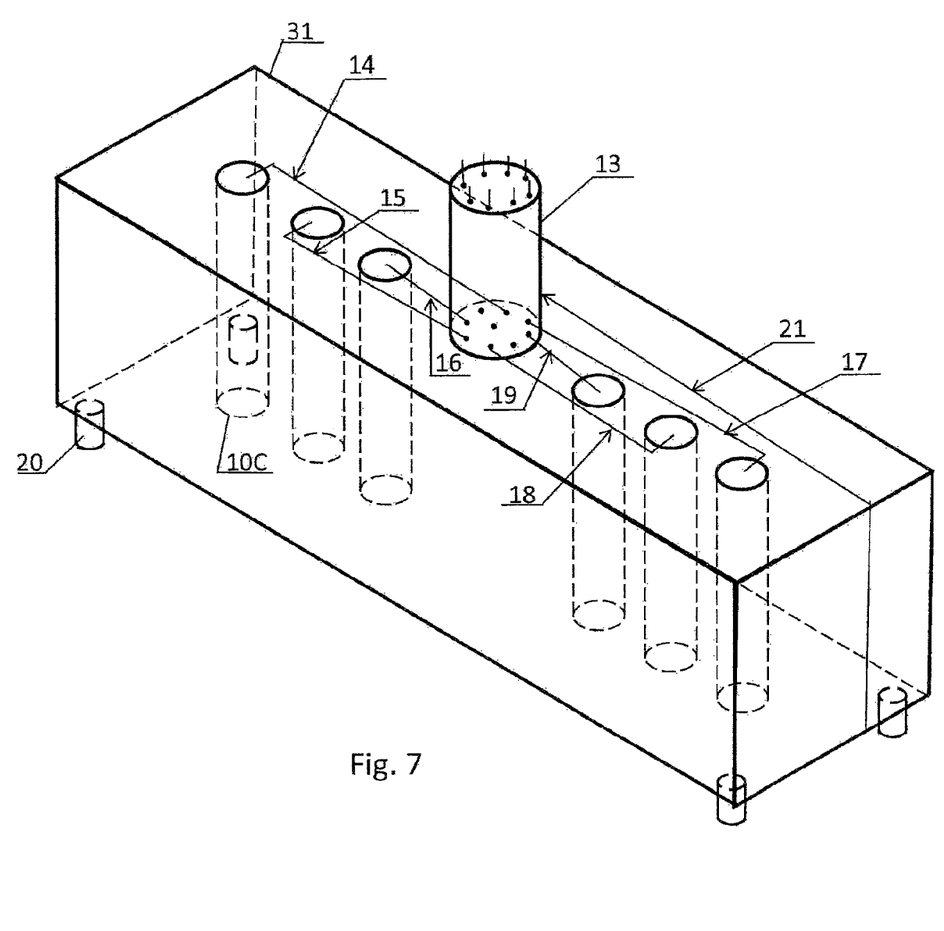
FIG. 7 is a schematic side view of the lid/cover of electro-hydraulic electrodes holder 6.

FIG. 7 shows the cover/lid 31. It is connected to the body 8 (see FIG. 6). It also has six vertical ports/openings 10C; they are parallel to the openings/ports 10A of the body 8. Electrodes are inserted into these ports. Positive wires 14-19 connected to the electrodes 42-47 (see FIG. 6) and to the bottom pats of the High Voltage Multipin Connector 13. High Voltage Multipin Connector 13 is located in the middle of the cover/lid 31 and serves as high voltage impulse to the electrodes in several microseconds. The electrodes must be made of conductive material.

FIG. 8 shows the cover 27 of the reactor's housing/corpus 1 (see FIG. 1). Since a positive charge is applied to the lid/cover of reactor and negative charge is applied on the housing/corpus of the reactor, thus an electro-static field occurs, which orders the process of movement of positively and negatively charged ions in different directions. The electromagnetic field is the result of an orderly movement of positively and negatively charged ions.

Between the housing/corpus 1 and the lid 27 fitted gas-tight gaskets 100. The thermometer and pressure sensor-tridicator boiler gauges 22 are located on the surface of the cover 27. A high pressure release valve 23 adjusts the pressure inside of the hydrogen reactor. An exhaust pipe 24 is a tube through which hydrogen is supplied to the consumer. Seven top parts of high voltage multipin connectors 13 are placed on the surface of the cover 27. Said top parts of the high voltage multi pin connectors of the lid/cover of the reactor are connected to the bottom parts of high voltage multipin connectors located on the lid of the electro-hydraulic electrodes holder. An electro-impulse dispenser 26 is situated on the cover 27, which transmits impulses to the electrolyzer's electrodes synchronously through high voltage multipin connectors 13. Impulses are supplied simultaneously to all the first electrodes of all seven electro-hydraulic electrodes holders 6;

then, to all second and so on until the last electrode. 28 is reactor's closure/latch to seal reactor tightly. The electro-impulse dispenser 26 creates powerful shocks by affecting the electrodes. The female part of the connector 13 is attached to the lid 27 of reactor; and the male part of the connector 13 is attached to the electro-hydraulic electrodes holder 6. Contact wires 32-38 connected to the electro-impulse dispenser 26.

Figure 9:
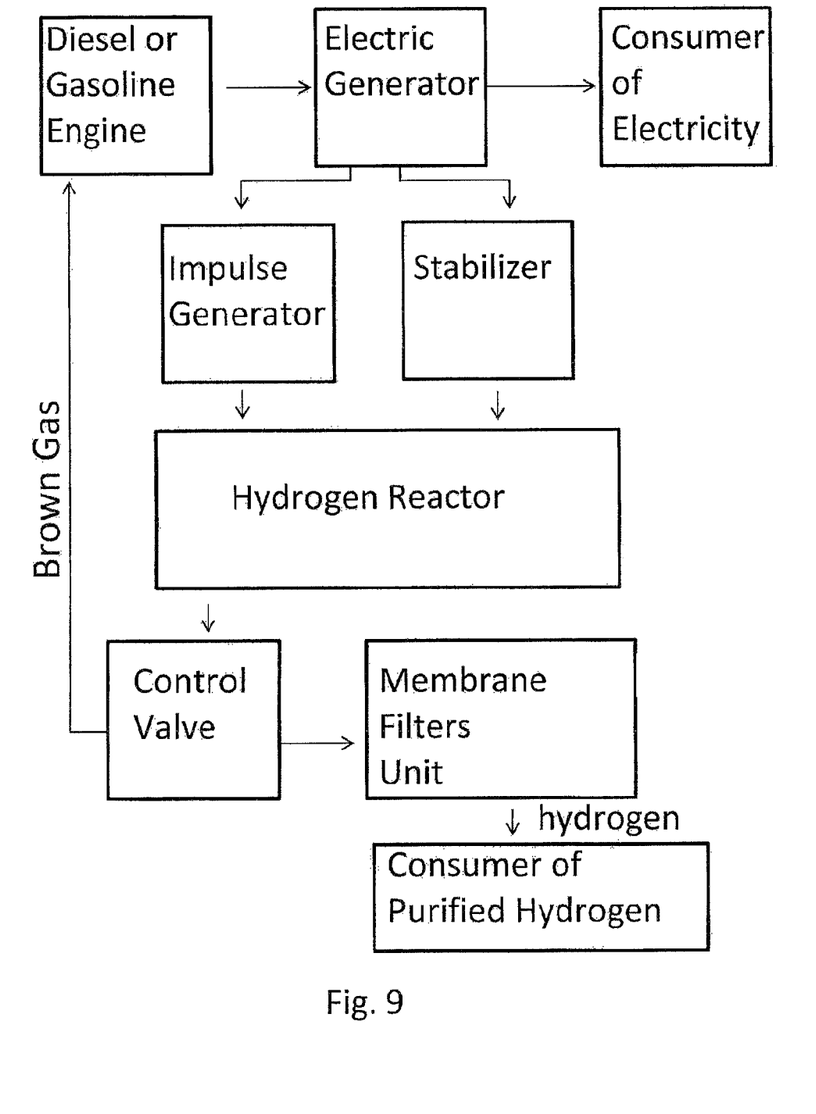
FIG. 9 is a schematic view of the system of the multifactorial hydrogen reactor in accordance with the present invention.

FIG. 9 shows is a schematic view of the system of the multifunctional hydrogen reactor in accordance with the present invention.

What is claimed is:

1. A method of generating hydrogen gas, the method comprising:
    generating electrical discharges within the water;
    using the water to perform oxidation of a solid material within the water;
    flowing an electric current through the water; and
    performing electrolysis within the water using the electric current and heat from the oxidation, wherein the electric current flows between an anode electrolysis electrode and a cathode electrolysis electrode, the method further comprising catalytically interacting the anode electrolysis electrode and the cathode electrolysis electrode with the water to form hydrogen gas, wherein the solid material comprises a first plurality of holes configured to be immersed in the water, the anode electrolysis electrode comprises a second plurality of holes configured to be immersed in the water, the cathode electrolysis electrode comprises a third plurality of holes configured to be immersed in the water.

2. The method of claim 1, wherein each of the anode electrolysis electrode and the cathode electrolysis electrode has a serpentine shape.

3. The method of claim 1, wherein each of the anode electrolysis electrode and the cathode electrolysis electrode comprises titanium.

4. The method of claim 1, wherein the electrical discharges generate electro-hydraulic shock waves which propagate through the water and which remove oxide film from the solid material, wherein the second plurality of holes and the third plurality of holes interact with the electro-hydraulic shock waves to produce cavitation within the water.

5. The method of claim 1, further comprising:
    containing the water in a housing comprising inner walls and catalytically interacting the inner walls with the water to form hydrogen gas; and
    applying a voltage difference between a cover and the housing, the cover electrically insulated from the housing.

6. The method of claim 1, wherein the solid material comprises a first aluminum plate and a second aluminum plate.

7. A method of generating hydrogen gas, the method comprising:
    generating electrical discharges within the water;
    using the water to perform oxidation of a solid material within the water;
    flowing an electric current through the water; and
    performing electrolysis within the water using the electric current and heat from the oxidation, further comprising containing the water in a housing comprising inner walls and catalytically interacting the inner walls with the water to form hydrogen gas and applying a voltage difference between a cover and the housing, the cover electrically insulated from the housing.

8. The method of claim 7, wherein the solid material comprises a first aluminum plate and a second aluminum plate.

9. The method of claim 8, wherein the solid material comprises a first plurality of holes configured to be immersed in the water, wherein the electric current flows between an anode electrolysis electrode and a cathode electrolysis electrode, the anode electrolysis electrode comprises a second plurality of holes configured to be immersed in the water, the cathode electrolysis electrode comprises a third plurality of holes configured to be immersed in the water.

10. The method of claim 7, further comprising using the electrical discharges to generate electro-hydraulic shock waves which propagate through the water and which remove oxide film from the solid material.

11. The method of claim 10, further comprising using the electro-hydraulic shock waves to produce cavitation within the water.

12. The method of claim 11, wherein the electric discharges generate plasma, electromagnetic fields, light energy, heat, and ionization within the water and the cavitation generates acoustic vibrations and turbulence within the water.

13. The method of claim 7, wherein the electric current flows between an anode electrolysis electrode and a cathode electrolysis electrode, the method further comprising catalytically interacting the anode electrolysis electrode and the cathode electrolysis electrode with the water to form hydrogen gas.

14. A method of generating hydrogen gas, the method comprising:
generating electrical discharges within the water;
using the water to perform oxidation of a solid material within the water;
flowing an electric current through the water; and
performing electrolysis within the water using the electric current and heat from the oxidation, wherein the solid material comprises a first aluminum plate and a second aluminum plate.

15. The method of claim 14, wherein the oxidation forms hydrogen gas and the electrolysis forms hydrogen gas.

16. The method of claim 14, further comprising using the electrical discharges to generate electro-hydraulic shock waves which propagate through the water and which remove oxide film from the solid material.

17. The method of claim 16, further comprising using the electro-hydraulic shock waves to produce cavitation within the water.

18. The method of claim 17, wherein the electric discharges generate plasma, electromagnetic fields, light energy, heat, and ionization within the water and the cavitation generates acoustic vibrations and turbulence within the water.

19. The method of claim 14, wherein the electric current flows between an anode electrolysis electrode and a cathode electrolysis electrode, the method further comprising catalytically interacting the anode electrolysis electrode and the cathode electrolysis electrode with the water to form hydrogen gas.

* * * * *